United States Patent [19]

Putatunda

[11] Patent Number: 5,704,950
[45] Date of Patent: Jan. 6, 1998

[54] PROCESS FOR MANUFACTURING FOOD GRADE COLORS FROM FLOWERS, TYPICALLY HIBISCUS

[76] Inventor: Dipten Putatunda, Jadhavji Bhavan, 296 Bhimanji Str, Matunga, Bombay, 40019, India

[21] Appl. No.: 713,164

[22] Filed: Sep. 12, 1996

[30] Foreign Application Priority Data

Sep. 15, 1995 [ZA] South Africa ............... 95/7770

[51] Int. Cl.$^6$ .................................................. C09B 61/00
[52] U.S. Cl. .................... 8/438; 8/646; 426/540; 426/489; 426/425
[58] Field of Search ............... 8/438, 646; 426/540, 426/489, 520, 615, 425

[56] References Cited

U.S. PATENT DOCUMENTS

| | | | |
|---|---|---|---|
| 3,963,700 | 6/1976 | Philip | 8/438 X |
| 4,156,077 | 5/1979 | Pifferi | 8/438 X |
| 4,211,577 | 7/1980 | Wallin | 8/646 |
| 4,238,518 | 12/1980 | Poisson | 8/438 X |
| 4,260,388 | 4/1981 | Mirabel et al. | 8/438 X |
| 4,302,200 | 11/1981 | Yokoyama et al. | 8/646 X |
| 4,320,009 | 3/1982 | Hilton et al. | 426/540 X |
| 4,358,286 | 11/1982 | Grollier et al. | 8/438 X |
| 4,383,833 | 5/1983 | Hoffmann | 8/438 |
| 4,400,400 | 8/1983 | Langston et al. | 8/438 X |
| 4,481,226 | 11/1984 | Crosby et al. | 8/438 X |
| 4,500,556 | 2/1985 | Langston | 8/438 X |

FOREIGN PATENT DOCUMENTS

| | | | |
|---|---|---|---|
| 60-246884 | 12/1985 | Japan | 8/646 |
| 62-127355 | 6/1987 | Japan | 8/646 |

*Primary Examiner*—Milton Cano
*Attorney, Agent, or Firm*—Bierman, Muserlian and Lucas LLP

[57] ABSTRACT

A process for the manufacture of food colors from hibiscus flowers comprising the steps of removing the calyx and the androceum of half bloom flowers; washing the flowers; and storing the flowers in a pre-cleaned stainless vessel; heating the flowers with water in a decoction chamber to at least 65 degrees to 70 degrees celsius; preparing a 5 percent w/v solution of an alkaline amino acid in demineralized water; adding the alkaline amino acid solution to the decoction chamber containing the flowers until the pH in the aqueous phase is 7.5 to 8; heating the mixture in the decoction chamber till the temperature of the aqueous phase exceeds boiling point and steam is generated with pressure of at least 1.2 kg/cm; continuing the heating process for 1 to 2 hours; cooling the solution in the decoction chamber to 20 degrees celsius and releasing the pressure; transferring the solution which is a colored solution so obtained from the decoction chamber to a closed stainless steel vessel; adding an acidic amino acid to make the solution mildly acidic; maintaining the acidic colored solution under nitrogen blanketting for 5 to 6 hours for maturation at 20 degrees celsius; filtering the matured extract; dissolving 15 percent w/v in a polysaccharide such as, lactose and/or maltodextrin in the filtrate; spray drying the filtered mature extract in a spray drier; and sieving the dried powder so obtained from the spray drier to obtain a food color.

7 Claims, 4 Drawing Sheets

STEP 1

STEP 2-5

STEP 6

STEP 7

STEP 8

STEP 9

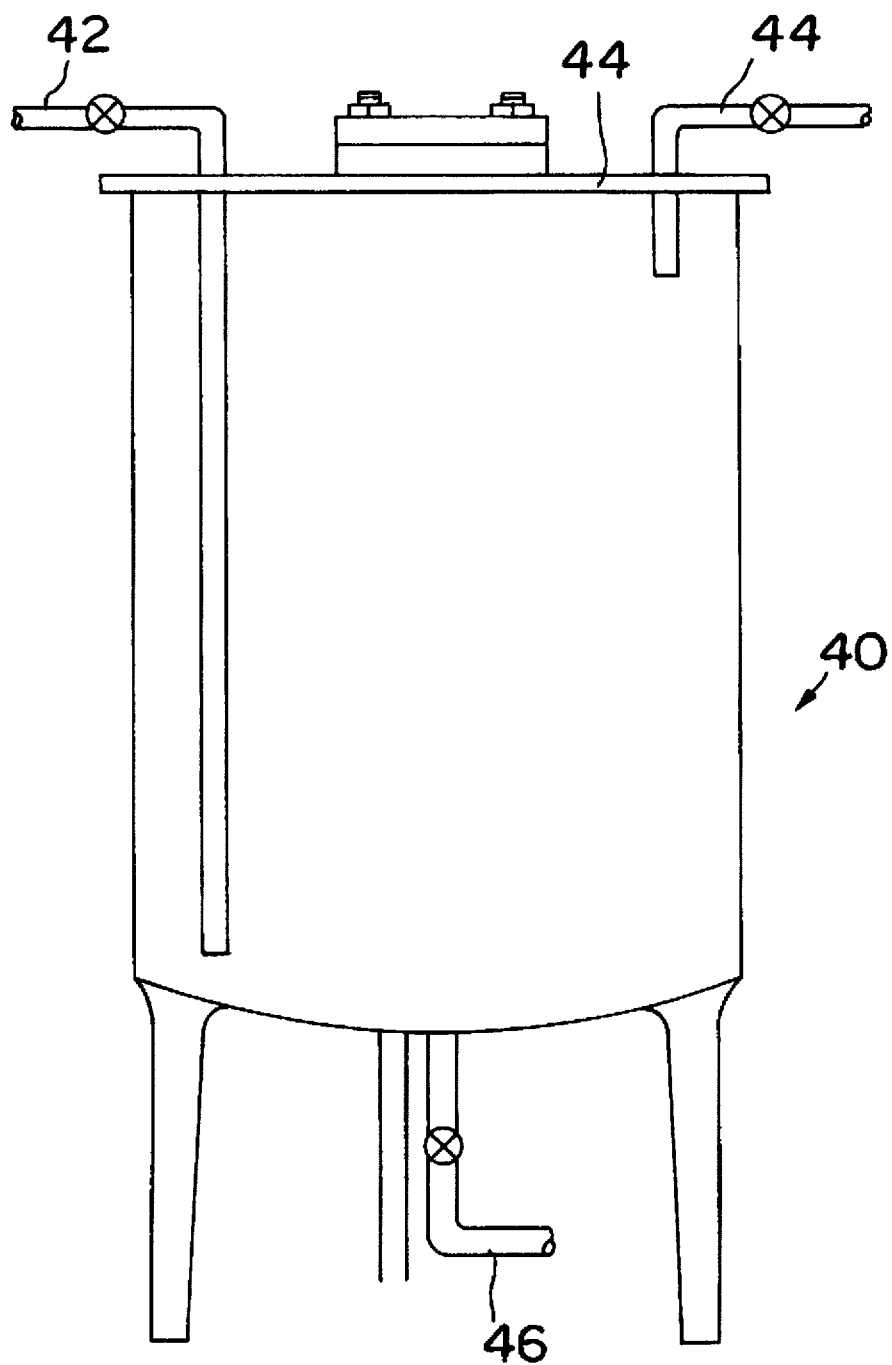
F I G. 4

PROCESS FOR MANUFACTURING FOOD GRADE COLORS FROM FLOWERS, TYPICALLY HIBISCUS

This invention relates to a process of manufacturing food colours from flowers, apparatus therefor and food colours made using the apparatus and following the method.

Currently, food colours are manufactured from organic/inorganic synthetic sources and are considered to be potential harmful.

Hitherto, the applicant is not aware of any process for the manufacture of extracting food colours from flowers. This invention discloses a process for the manufacture of food grade colours from flowers, typically hibiscus.

According to this invention there is provided a process for the manufacture of food colours from flowers, typically hibiscus flowers comprising the steps of removing the calyx and the androceum of half bloom flowers;

washing the flowers; and storing the flowers in a pre-cleaned stainless vessel;

heating the flowers with water in a decoction chamber to at least 65 degrees to 70 degrees Celsius;

preparing a 5 percent w/v solution of an alkaline amino acid in demineralised water;

adding the alkaline amino acid solution to the decoction chamber containing the flowers until the pH in the aqueous phase is 7.5 to 8;

heating the mixture in the decoction chamber till the temperature of the aqueous phase exceeds boiling point and steam is generated with pressure of at least 1.2 kg/cm;

continuing the heating process for 1 to 2 hours;

cooling the solution in the decoction chamber to 20 degrees celsius and releasing the pressure;

transferring the solution which is a coloured solution so obtained from the decoction chamber to a closed stainless steel vessel;

adding an acidic amino acid to make the solution mildly acidic;

maintaining the acidic coloured solution under nitrogen blanketting for 5 to 6 hours for maturation at 20 degrees Celsius;

filtering the matured extract;

dissolving 15 percent w/v in a polysaccharide such as, lactose and/or maltodextrin in the filtrate;

spray drying the filtered mature extract in a spray drier; and sieving the dried powder so obtained from the spray drier to obtain a food colour.

Typically, the flowers are washed with dimineralised water.

Typically the water in which the flowers are heated in the decoction chamber is demineralised.

Typically, the alkaline amino acid is D L Arginine.

Typically, the temperature of the solution in the spray drier is maintained at 70 to 75 degrees Celsius.

Typically, the acidic amino acid is D L cysteine.

Typically the spray dried powder is sieved through a mesh having mesh size of 60 mesh.

The invention will now be described with reference to the accompanying drawings in which.

Figure 1:
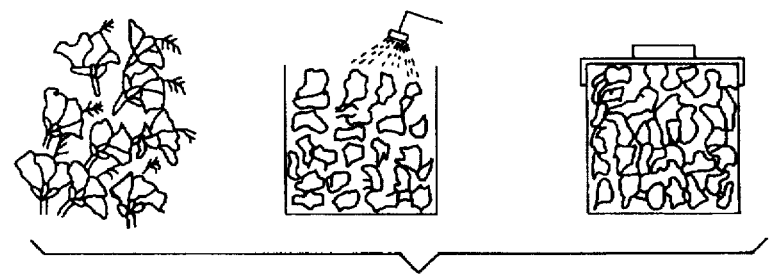
FIG. 1 is a flow diagram of the process in accordance with this invention for the manufacture of food grade colours from flowers, typically hibiscus flowers.
Figure 1:
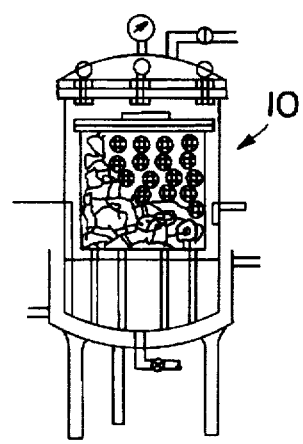
Figure 1:
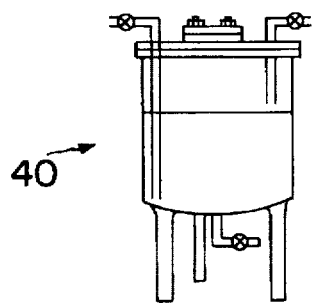
Figure 1:
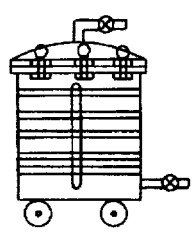
Figure 1:
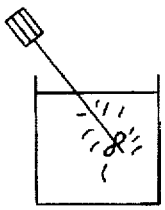
Figure 1:
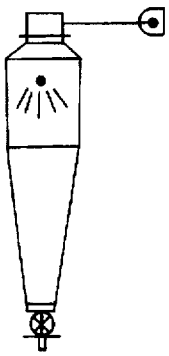
Figures 2A, 2B:
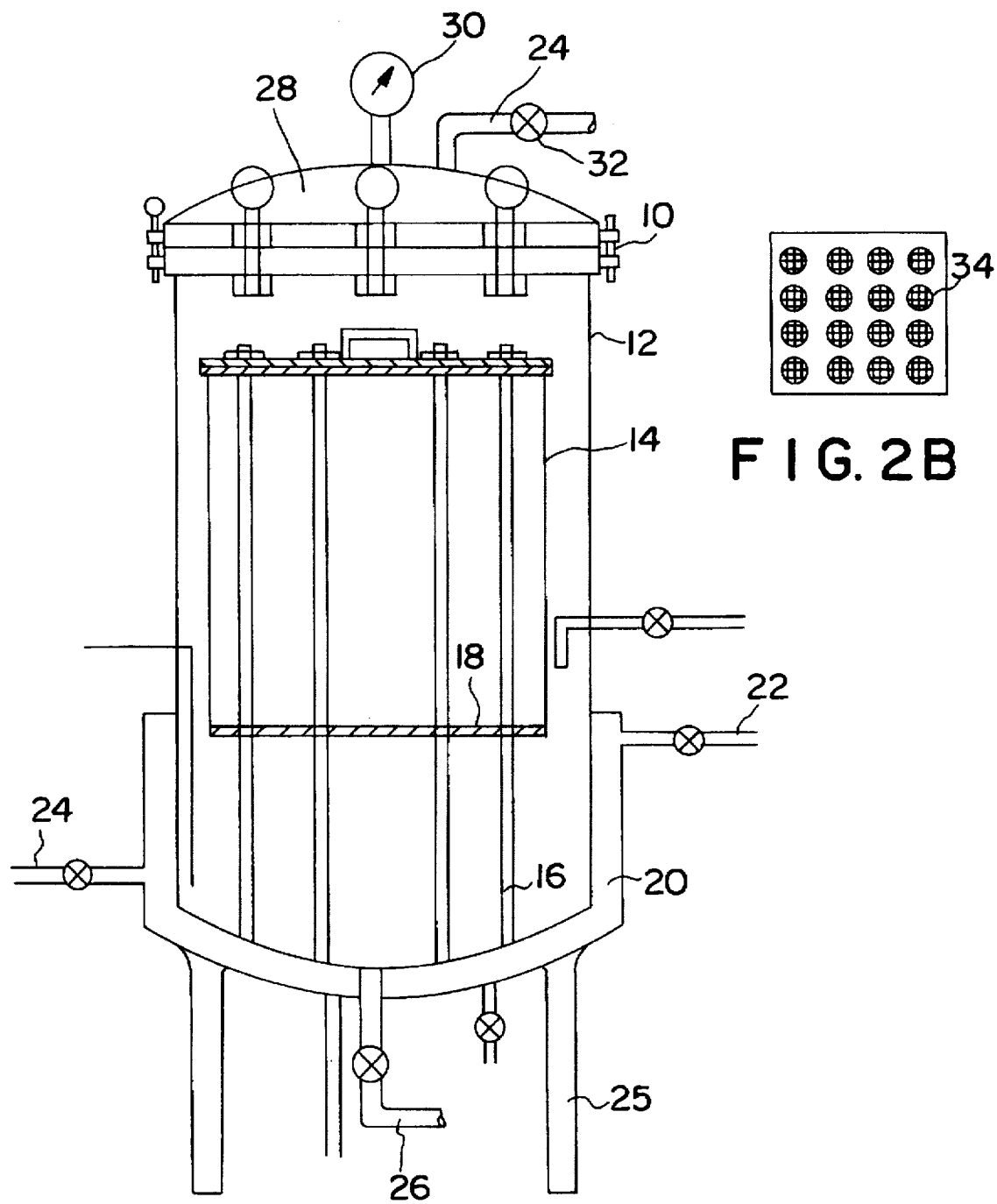
FIG. 2 is a schematic sectional view of the decoction chamber used in the process of manufacturing food grade colours from flowers, typically hibiscus flowers.
Figure 3A:
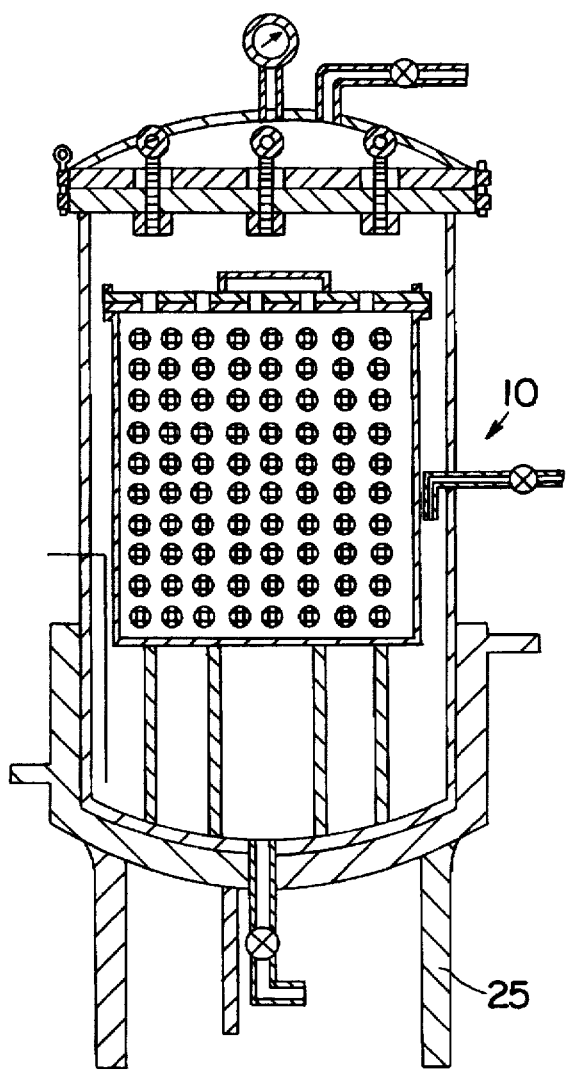
Figure 3B:
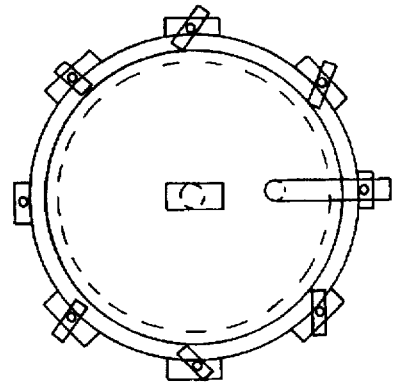
Figure 3C:
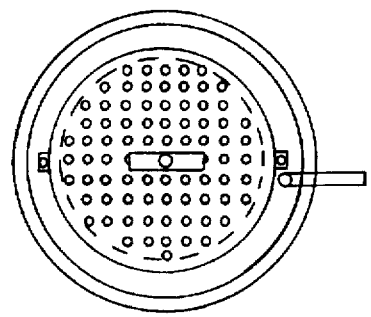
Figure 3D:
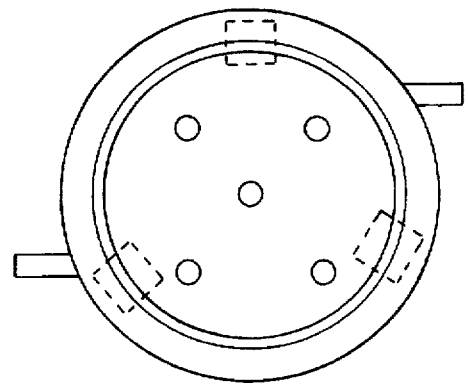

FIGS. 3,$a$,$b$,$c$,$d$ are sectional views of the decocotion chamber of FIG. 2; and FIG. 4 is a schematic sectional view of the maturation vessel for the process of FIG. 1.

The invention will now be described with reference to the accompanying drawings examples which in no way limit the ambit and the scope of the invention, and which illustrate the process in accordance with this invention for the manufacture of food grade colours from flowers, typically hibiscus flowers FIG. 1 generally indicates the process of manufacturing food colours from flowers, typically, hibiscus flowers.

Step 1 involves (a) selecting the flowers;

(b) removing the calyx and the androceum of half bloom flowers washing the flowers;

and (c) storing the flowers in a pre-cleaned stainless vessel. Typically, the flowers are washed with dimineralised water.

Steps 2 to 5 take place in a decoction chamber more particularly illustrated in FIGS. 2 and 3. Steps 2 to 5 involve:

heating the flowers with water in a decoction chamber to at least 65 degrees to 70 degrees Celsius;

preparing a 5 percent w/v solution of an alkaline amino acid in demineralised water;

adding the alkaline amino acid solution to the decoction chamber containing the flowers until the pH in the aqueous phase is 7.5 to 8;

heating the mixture in the decoction chamber till the temperature of the aqueous phase exceeds boiling point and steam is generated with pressure of at least 1.2 kg/cm;

continuing the heating process for 1 to 2 hours; cooling the solution in the decoction chamber to 20 degrees celsius and releasing the pressure.

Typically the water in which the flowers are heated in the decoction chamber is demineralised.

Typically, the alkaline amino acid is D L Arginine.

Step 6 takes place in a closed stainless steel vessel more particularly illustrated in FIG. 4. Step 6 involves:

transferring the solution which is a coloured solution so obtained from the decoction chamber to a closed stainless steel vessel;

adding an acidic amino acid to make the solution mildly acidic;

maintaining the acidic coloured solution under nitrogen blanketting for 5 to 6 hours for maturation at 20 degrees Celsius.

Typically, the acidic amino acid is D L cysteine.

Steps 7 and 8 involve:

filtering the matured extract; dissolving 15 percent w/v in a polysaccharide such as, lactose and/or maltodextrin in the filtrate;

Step 9 involves:

spray drying the filtered mature extract in a spray drier; and sieving the dried powder so obtained from the spray drier to obtain a food colour.

FIGS. 2 and 3 illustrate the decoction chamber 10 of the process in accordance with this invention in which steps 2 to 5 are carried out.

The decoction chamber 10 comprises an outer vessel 12, typically of 150 cm height and 60 cms diameter fabricated of stainless steel of 5 mm gauge. Within the outer vessel 12 is placed an inner vessel 14 which has a perforated body typically as illustrated in FIGS. 2 and 3. The inner vessel 14, typically of 3 mm gauge stainless steel rests on four vertical supports 16 within the outer vessel 12. Within the inner vessel 14 a thick flat plate 18 capable of relatively downward and upward displacement, is fitted. The flat plate is typically of stainless steel and is 5 mm thick. Typically the plate 18 is round with an outer diameter of 52 cms. Upward and downward movement is effected by screws capable of being rotated by a bar handle, (not illustrated in the figures). The screw is supported by four tie rods.

The outer vessel 12 is partially jacketed at its base by a jacket 20. The jacket 20 is provided with inlets 22 and outlets 24 for steam and cooling water introduction/ extraction/expulsion. The decoction chamber rests on a soiled support 25 of stainless steel. A drain valve 26 is provided for draining decoction liquid from the vessel 10. In addition, the outer vessel 12 is provided with a removable lid 28 which can be slidably mounted to the vessel 12 or can be clamped. A steam pressure gauge 30 is provided in the lid 28.

A valve 32 is also fitted to the outlet 24 for releasing the pressure of steam generated in the vessel 12. Typically the inner vessel 14 has perforations 34 as particularly detailed in FIGS. 2 and 3 over the entire walls of the vessel 14.

Steps 2 to 5 of the process of this invention are carried out in the decocotion chamber 10 which involves:

heating the flowers with water in the decoction chamber 10 to at least 65 degrees to 70 degrees Celsius; preparing a 5 percent w/v solution of an alkaline amino acid in demineralised water; adding the alkaline amino acid solution to the decoction chamber containing the flowers until the pH in the aqueous phase is 7.5 to 8 heating the mixture in the decoction chamber till the temperature of the aqueous phase exceeds boiling point and steam is generated with pressure of at least 1.2 kg/cm;

continuing the heating process for 1 to 2 hours;

cooling the solution in the decoction chamber to 20 degrees Celsius and releasing the pressure.

FIG. 4 illustrates the maturation vessel 40 used for Step 6 which involves: transferring the solution which is a coloured solution so obtained from the decoction chamber 10 to the closed stainless steel vessel and adding an acidic amino acid to make the solution mildly acidic and maintaining the acidic coloured solution under nitrogen blanketting for 5 to 6 hours for maturation at 20 degrees Celsius. Typically, the acidic amino acid is D L cysteine. The vessel 40 is provided with an inlet 42 for introducing nitrogen and an outlet 44 for expelling nitrogen. A lid 44 and an outlet 46 for removing the matured solution for further treatment that is filtering, addition of polysaccharides and spray drying in accordance with steps 7 to 9 of the process illustrated in FIG. 1

The filtering apparatus, the apparatus for adding polysaccharides to the coloured solution and the spray drying apparatus of steps 7 to 9 of the process illustrated in FIG. 1 are are well known apparatus and are not further illustrated or described herein.

The invention will now be described with reference to the accompanying examples which in no way limit the ambit and the scope of the invention.

EXAMPLE 1

10 kgs of whole half bloom hibiscus flowers were selected. The calyx and the androceum of the half bloom flowers were removed. This left behind 6.97 kg of flower material. The flower material (petals) were washed in demineralised water and stored in a pre-cleaned stainless vessel. The flowers were heated with water in a decoction chamber to 70 degrees Celsius. A 5 percent w/v solution of 1 gm DL Arginine was prepared in demineralised water, and was added to the decoction chamber containing the flowers until the pH in the aqueous phase is 7.5 to 8. The mixture in the decoction chamber was heated till the temperature of the aqueous phase exceeds boiling point and steam was generated with pressure of 1.2 kg/cm. The heating process was continued for 1 to 2 hours. Thereafter, the cooling of the solution took place in the decoction chamber to 20 degrees Celsius and the pressure was released. The solution which was a coloured solution so obtained from the decoction chamber was transferred to a closed stainless steel vessel. Amino acid D L Cysteine 1.2 gms was added to make the solution mildly acidic. The acidic coloured solution was maintained under nitrogen blanketting for 5 to 6 hours for maturation at 20 degrees Celsius. The matured extract was filtered and 15 percent w/v in a polysaccharide dissolved such as, lactose and/or maltodextrin 14.25 kgs in the filtrate of 95 liters. The solution was spray dryed in a spray drier; and after sieving the dried powder so obtained from the spray drier gave a yield of 13.25 kg of food grade colour.

EXAMPLE 2

12 kg of whole half bloom Alamenda Catheritica flowers were selected. The calyx and the androceum of the half bloom flowers were removed. This left behind 7.87 kg of flower material. The flower material (petals) were washed in dimineralised water and stored in a pre-cleaned stainless vessel. The flowers were heated with water in a decoction chamber to 70 degrees Celsius. A 5 percent w/v solution of 1 gm DL Arginine was prepared in demineralised water, and was added to the decoction chamber containing the flowers until the pH in the aqueous phase is 7.5 to 8. The mixture in the decoction chamber was heated till the temperature of the aqueous phase exceeds boiling point and steam was generated with pressure of 1.2 kg/cm. The heating process was continued for 1 to 2 hours. Thereafter, the cooling of the solution took place in the decoction chamber to 20 degrees Celsius and the pressure was released. The solution which was a coloured solution so obtained from the decoction chamber was transferred to a closed stainless steel vessel. Amino acid D L Cysteine 1.2 gms was added to make the solution mildly acidic. The acidic coloured solution was maintained under nitrogen blanketting for 5 to 6 hours for maturation at 20 degrees Celsius. The matured extract was filtered and 15 percent w/v in a polysaccharide dissolved such as, lactose and/or maltodextrin 13.95 kgs in the filtrate of 93 liters. The solution was spray dryed spray drier; and after sieving the dried powder so obtained from the spray drier gave a yield of 12.69 kg of food grade colour.

I claim:

1. A process for the manufacture of food colours from hibiscus flowers comprising the steps of removing the calyx and the androceum of half bloom flowers;

washing the flowers; and storing the flowers in a precleaned stainless vessel;

heating the flowers with water in a decoction chamber from at least 65 degrees to 70 degrees Celsius;

preparing a 5 percent w/v solution of an alkaline amino acid in demineralised water;

adding the alkaline amino acid solution to the decoction chamber containing the flowers until the pH in the aqueous phase is 7.5 to 8;

heating the mixture in the decoction chamber till the temperature of the aqueous phase exceeds boiling point and steam is generated with pressure of at least 1.2 kg/cm;

continuing the heating step for 1 to 2 hours;

cooling the solution in the decoction chamber to 20 degrees Celsius and releasing the pressure;

transferring the solution which is a coloured solution so obtained from the decoction chamber to a closed stainless steel vessel;

adding an acidic amino acid to make the solution acidic;

maintaining the acidic coloured solution under nitrogen blanketting for 5 to 6 hours for maturation at 20 degrees Celsius;

filtering the matured solution;

dissolving a 15 percent w/v solution of a polysaccharide selected from the group consisting of, lactose and maltodextrin in the filtrate;

spray drying the filtrate in a spray drier; and sieving the dried powder so obtained from the spray drying step to obtain a food colour.

2. A process for the manufacture of food colours from hibiscus flowers as claimed in claim 1, wherein, the flowers are washed with dimineralised water.

3. A process for the manufacture of food colours from hibiscus flowers as claimed in claim 1, wherein, the water in which the flowers are heated in the decoction chamber is demineralised.

4. A process for the manufacture of food colours from hibiscus flowers as claimed in claim 1, wherein, the alkaline amino acid is D L Arginine.

5. A process for the manufacture of food colours from hibiscus flowers as claimed in claim 1, wherein, the temperature of the filtrate in the spray drier is maintained at 70 to 75 degrees Celsius.

6. A process for the manufacture of food colours from hibiscus flowers as claimed in claim 1, wherein, the acidic amino acid is D L cysteine.

7. A process for the manufacture of food colours from hibiscus flowers as claimed in claim 1, wherein, the spray dried powder is sieved through a mesh having mesh size of 60 mesh.

* * * * *